Patented Aug. 10, 1954

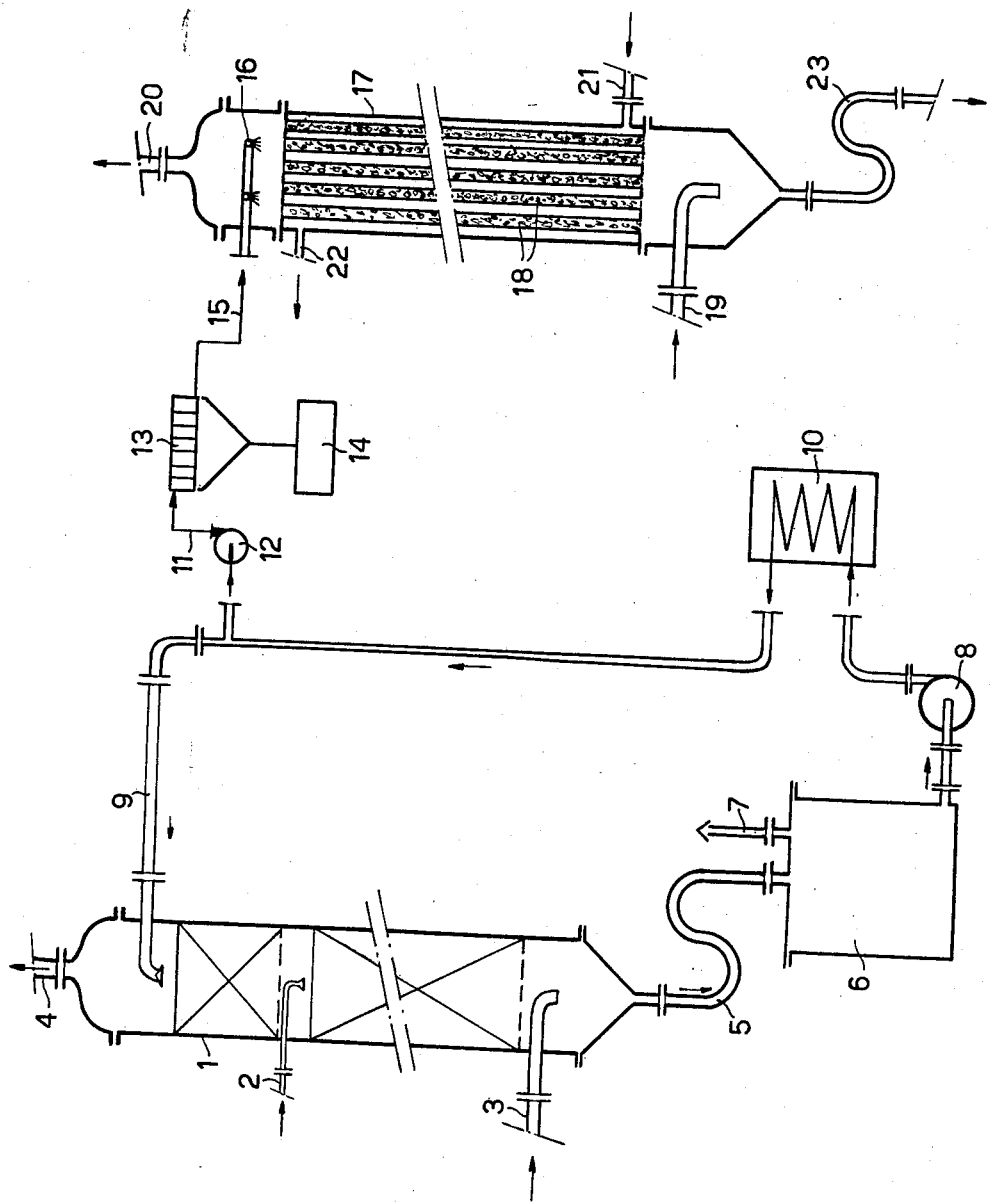

2,686,106

UNITED STATES PATENT OFFICE 2,686,106

MANUFACTURE OF AMMONIUM NITRILOSULFONATE

Rudolph N. G. Zeegers, Pladjoe, Sumatra, Indonesia, assignor to Stamicarbon N. V., Heerlen, Netherlands Application September 16, 1952, Serial No. 309,821
Claims priority, application Netherlands March 4, 1950

5 Claims. (Cl. 23—190)

This invention relates to the manufacture of ammonium nitrilosulfonate, $N(SO_3NH_4)_3$, a compound of special importance as a starting material in the manufacture of ammonium sulfamate now used on a large scale as a herbicide.

This application is a continuation-in-part of my copending United States application, Serial No. 211,615, filed February 19, 1951, and now abandoned.

Field of invention

It is well known that small amounts of nitrilosulfonates are formed as a result of side reactions occurring during the manufacture of hydroxylamine disulfonates from sulfur dioxide and a mixture of nitrites and bisulfites in aqueous solution.

In my copending application, Serial No. 112,863, filed August 29, 1949, and now United States Patent No. 2,555,667, there is described and claimed a novel procedure for continuously manufacturing hydroxylamine disulfonates involving the use of sulfur dioxide, nitrites and bisulfites. According to this patent, the desired product is, in essence, obtained by a four-stage procedure involving the reaction, in a first stage, of sulfur dioxide with a cooled aqueous solution of a nitrite and a bisulfite, followed by further treatment, in a second stage, of a portion of the reaction mixture with additional sulfur dioxide under lower pH conditions until all nitrite present is reacted, treatment of the resulting mixture with inert gas until sulfur dioxide is dispelled from the mixture and finally hydrolysis of the reaction product to give the desired hydroxylamine disulfonate.

Another procedure for producing hydroxylamine disulfonates is described and claimed in my copending application, Serial No. 211,255, filed February 16, 1951, the procedure in this particular application being characterized by the feature of effecting the desired reaction between the sulfur dioxide and the aqueous solution of nitrite and bisulfite by dispersing the aqueous solution in sulfur dioxide and concurrently flowing sulfur dioxide and the dispersed solution over a cooled surface. In both Serial No. 211,255 and United States Patent No. 2,555,667, ammonium nitrite and ammonium hydroxide may be used as starting materials for production of the desired disulfonate.

The use of ammonium nitrite and ammonium hydroxide as starting materials in this manufacturing process will, under certain conditions, lead to the formation of ammonium nitrilosulfonate in a side reaction which proceeds according to the equation:

The ammonium nitrilosulfonate which is only slightly soluble in the reaction liquor is unstable in an acid medium and is almost immediately hydrolyzed according to the equations:

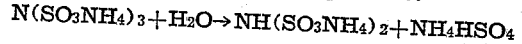
imido sulfonate

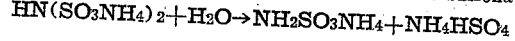
amido sulfonate (or ammonium sulfamate)

The compounds formed are soluble and, therefore, contaminate the hydroxylamine sulfonate which is the main product of the process. Hence, if the ammonium nitrilosulfonate is not removed, the hydroxylamine sulfonate obtained as the main product will always be contaminated with some ammonium sulfamate. If this contaminated main product is used as a starting material, as is customary, for the manufacture of oximes, the ammonium sulfate obtained as a product of such a process, will always contain some ammonium sulfamate. Ammonium sulfate is usable as a fertilizer, but if the herbicide, ammonium sulfamate, contaminates this product, then an undesirable type of mixture is obtained. Hence, it is desirable to obtain an hydroxylamine sulfonate which is not contaminated with any appreciable quantity of ammonium nitrilosulfonate.

It has now been discovered that ammonium nitrilosulfonate can be recovered as a by-product in the manufacture of hydroxylamine sulfonate and a by-product-free reaction liquor particularly adapted for the production of hydroxylamine sulfonate obtained if the procedures broadly described in United States Patent No. 2,555,667 are modified in a specific and unusual manner.

The above-mentioned discovery is based on a number of unexpected observations. First, it has been noted that, when using ammonium nitrite and ammonium bisulfite, or an ammonium bisulfite-forming compound, in the procedures of the above-mentioned patent and carrying out the first stage reaction at a pH of between 5 and 7, a somewhat cloudy reaction liquor is obtained due to the formation therein of a precipitate not readily separable by ordinary commercial separatory means which has been found to be substantially completely ammonium nitrilosulfonate. It has further been found that this precipitate, while non-separable according to the procedures of United States Patent No. 2,555,667, can be made separable from the reaction liquor provided only a very small quantity thereof, specifically from 0.5 to 3% by volume is fed to the second stage for reaction with sulfur dioxide, the remainder of the reaction liquor (97 to 99.5% by volume) being recycled to the first stage for further reaction with sulfur dioxide at a pH of between 5 and 7.

Objects

A principal object of this invention is the provision of new improvements in the general process for making ammonium nitrilosulfonate by the reaction of sulfur dioxide with an aqueous solution containing ammonium nitrite and ammonium bisulfite or its chemical equivalent. Further objects include:

(1) The provision of such procedures in which a reaction liquor is obtained that can be employed for further reaction with sulfur dioxide to yield hydroxylamine sulfonates substantially uncontaminated with nitrilosulfonates or the hydrolysis products thereof, such as ammonium sulfamate;

(2) The provision of such procedures in which substantially the only by-product formed in the operation for making hydroxylamine sulfonates is a substantially pure nitrilosulfonate which can be treated to yield a valuable herbicide, namely, ammonium sulfamate;

(3) The provision of new improvements in the two-stage process for making hydroxylamine sulfonates from ammonium nitrite in which the contamination of the product, by nitrilosulfonates or hydrolysis products thereof as experienced in the conduction of prior known methods, is eliminated.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

General description

According to the present invention, the foregoing objects are accomplished by means of certain improvements in the procedures of my United States Patent No. 2,555,667 including the steps of maintaining the reaction mixture of sulfur dioxide, ammonium nitrite and ammonium bisulfite, or equivalent thereof, in the first stage at a pH of between 5 and 7, feeding from 0.5 to 3% by volume of the reaction liquor of the first stage to the second stage for reaction with additional sulfur dioxide and subsequent formation of hydroxylamine sulfonate, and recycling the remainder of the reaction liquor through the first stage for reaction with sulfur dioxide at a pH of between 5 and 7 to form a separable ammonium nitrilosulfonate precipitate in the reaction liquor and removing said precipitate, at a pH of between 5 and 7, from the reaction liquor fed to the second zone.

As indicated above, it has been found that, if the initial contact of sulfur dioxide with the ammonium nitrite-containing solution is made at a pH of between 5 and 7, the only principal by-product is ammonium nitrilosulfonate which can be removed, within the designated pH range, to give an aqueous solution that can be reacted further with sulfur dioxide without the formation of any by-products at the lower pH necessary to form desired quantities of hydroxylamine sulfonates, provided the major proportion, i. e., 97 to 99.5% by volume, of the first stage reaction liquor is recycled. Apparently, the formation of a separable precipitate of ammonium nitrilosulfonate is due, to a large extent, to the longer contact made possible by the large proportion of reaction liquor recycled at the designated pH range. In any event, the fact that the ammonium nitrilosulfonate can be substantially completely separated out, under the prescribed pH and recycle conditions, is quite surprising, particularly when it is realized that, when starting with sodium or potassium salts, it is not possible to obtain a separable precipitate of potassium or sodium nitrilosulfonate under similar conditions even though such sodium and potassium salts are theoretically less soluble in the reaction liquor.

A more complete understanding of the procedures and details of this invention can be obtained by reference to the following example of an actual operation of the process and by reference to the accompanying drawing, in which the figure is a diagrammatic, vertical cross section through one form of apparatus which may be employed in carrying out the new procedures.

Example

An aqueous solution, containing 138 g. ammonium nitrite and 80 g. ammonium hydroxide per litre, is continuously fed into a reaction vessel 1 through the inlet pipe 2 so that the solution flows down countercurrently to an ascending stream of roasting gas (sulfur dioxide content 6% by volume) which is introduced into the lower section of the reaction vessel through the gas inlet pipe 3. The contact between the roasting gas and the reaction liquor is promoted by packing the reaction vessel 1 with filling bodies. The residual gas is carried off through the gas outlet 4. By regulating the supply of the sulfur dioxide-containing gas, the pH value of the reaction liquor in the reaction vessel 1 is maintained at 5.5 to 6.

The reaction mixture, which contains precipitated ammonium nitrilosulfonate, is drained through the bottom of the reaction vessel 1 and passes through the pipe 5 towards a collecting tank 6 which is provided with an air discharge pipe 7. By means of a pump 8, the reaction mixture is subsequently passed through a circulation pipe 9 which is provided with a cooler 10, and re-introduced into the reaction vessel 1 at a point located over the inlet 2 for the liquid, so that the ammonia-containing vapors formed near the inlet 2 cannot be carried out of the reaction vessel by the ascending gases, but dissolve in the reaction mixture which is returned through the circulation pipe 9. Part of the circulating reaction mixture (2.5% by volume thereof) is drained from the circulation pipe and passed, by means of a pump 12, through a pipe 11 and supplied to a filter 13. Here, the precipitated ammonium nitrilosulfonate is separated and is subsequently collected in a reservoir 14.

After the precipitate has been separated, the reaction liquor flows through the pipe 15 and the distributing ring 16 into a second reaction vessel 17. In this reaction vessel 17, the liquor, flowing down through the pipes 18, which are packed with filling bodies, is brought into contact with roasting gas (sulfur dioxide content 6% by volume) which, supplied through the gas inlet 19, ascends through the cooled pipes 18 countercurrently to the reaction liquor. The pipes 18 are cooled by means of a refrigerant which is supplied through the pipe 21 and discharged from the reaction vessel through the pipe 22. The residual gas is carried off through the gas outlet 20. The supply of the sulfur dioxide-containing roasting gas is so adjusted that the reaction liquor, on leaving the pipes 18, has a pH value of about 3.5.

The reaction liquor is discharged through the pipe 23 and freed from dissolved sulfur dioxide by means of air. In this manner, a final liquor is obtained which contains 427 g. ammonium hydroxylamine disulfonate, $NOH(SO_3.NH_4)_2$ per litre, corresponding to a yield of 88% based on the initial ammonium nitrite.

The amount of separated ammonium nitrilosulfonate, $N(SO_3.NH_4)_3.2H_2O$, is 44 kg. per cu. meter of final liquor, a yield of 6% based on the ammonium nitrite, so that the total yield of the ammonium nitrite conversion is 94%.

Discussion of details

As indicated above, the quantity of reaction liquor fed to the second stage for the subsequent formation of hydroxylamine sulfonate must be kept within certain critical limits in order that a separable precipitate of ammonium nitrilosulfonate be obtained. Specifically, only from 0.5 to 3%, and preferably 2.5% by volume of the reaction liquor derived from the first stage should be fed to the second stage. In other words, from 97 to 99.5% by volume of the first stage reaction liquor is returned, or recycled, to the first stage, along with enough additional nitrite-bisulfite solution to make up for that drawn off if continuous operations are employed, for further countercurrent contact with sulfur dioxide to render separable the by-product ammonium nitrilosulfonate. The latter is ultimately separated, preferably in continuous fashion, from the relatively small amount of reaction liquor fed to the second stage. Such separation of the nitrilosulfonate can be carried out in any convenient way, for example, by passing the reaction mixture through a filter or a centrifuge in which the precipitated by-product is retained, while the liquor in introduced into a reaction vessel in which a lower pH is maintained.

If the reaction between the ammonium compounds and sulfur dioxide is carried out in such a manner that the reaction liquor is circulated by means of pumps, the process according to the invention may be carried out, for example, by removing the nitrilosulfonate in a separator, such as a centrifuge, which is inserted in the circulation pipe. It is also possible to return part of the reaction liquor from the separator to the circulation pipe for recirculation.

The separated ammonium nitrilosulfonate may be hydrolyzed to ammonium sulfamate in a simple manner, either by use of an acid medium or by heating this product in water.

It is possible to vary different conditions during the process and obtain satisfactory results, although much more desirable yields and results are obtained if certain limitations are observed. Thus, the temperature of reaction mixtures may be varied, although it is preferable that the temperature of the reaction liquor, while at a pH between 5 and 7, should be between about 10° C. and 50° C. and especially between 20° and 40° C. Likewise, in the second stage, when the hydroxylamine sulfonate is formed, various temperatures may be employed, but preferably a temperature between about 20° C. down to the freezing point of the liquor is used, and especially a temperature about 0° C.

Variations in the proportions of reactants are possible, but for best results about equi-molecular proportions of ammonium nitrite and ammonium bisulfite, or its equivalent, or a slight excess of the ammonium bisulfite over the ammonium nitrite, should be used, e. g., between about 1 to 1.5 mols of ammonium bisulfite, or equivalent, for each mol of ammonium nitrite. Similarly, a variation in the proportion of sulfur dioxide or sulfur dioxide gas to the ammonium nitrite-containing liquor may be used. The exact proportion will depend to a large extent upon the quantity of sulfur dioxide in the gas used and also to some extent upon the nature of the gas. However, this is controlled so that the pH of the liquor during the first stage is maintained between 5 and 7, and in the second stage between 3 and 4.

As indicated, ammonium bisulfite may be replaced by other reagents which are the equivalent thereof when present in aqueous solutions along with sulfur dioxide. Examples of such materials include: ammonium hydroxide, ammonium sulfite or the like.

Conclusions

The invention, as described above, provides new improvements in the general art of reacting ammonium nitrite and ammonium bisulfite in aqueous solution with sulfur dioxide. These new improvements make it possible to obtain commercially desirable quantities of ammonium nitrilosulfonate as the principal and only by-product of the general reaction and to form reaction liquors which may be processed further to yield hydroxylamine sulfonate substantially uncontaminated with sulfamates, as has been the case with prior known methods. Consequently, the valuable herbicide ammonium sulfamate can be obtained as one phase of this new type of operation and the products useful as fertilizers and uncontaminated with the herbicide as another phase thereof.

I claim:

1. In the production of hydroxylamine sulfonates by a process involving the steps of providing an aqueous solution of ammonium nitrite and a substance from the group consisting of ammonium bisulfite and ammonium compounds which react in aqueous solution with sulfur dioxide to give ammonium bisulfite, intimately mixing sulfur dioxide with said aqueous solution in a first reaction stage and thereafter further treating the resulting liquid with sulfur dioxide in a second reaction stage, the improvements whereby ammonium nitrilosulfonate is recovered as a by-product and a reaction liquor is obtained which is suitable for use in the second stage for the manufacture of a substantially by-product free hydroxylamine sulfonate, said improvements comprising the steps of continuously maintaining the reaction liquor in the first stage at a pH of between 5 and 7, feeding from 0.5 to 3% by volume of the reaction liquor of the first stage to said second stage for reaction with additional sulfur dioxide and subsequent formation of hydroxylamine sulfonate and recycling the remainder of the reaction liquor through said first stage for reaction with sulfur dioxide to form a separable ammonium nitrilosulfonate precipitate in the reaction liquor, and removing said precipitate, at a pH of between 5 and 7, from the reaction mixture fed to the second stage at a point after the completion of the first stage of the reaction and prior to the point of the introduction into the second stage of the reaction.

2. The process of claim 1 wherein about 2.5% of the first stage reaction liquor is fed to the second stage, the remainder being recycled to the first stage.

3. A process as claimed in claim 1 wherein said intimate mixing is accomplished by spraying said solution into a stream of gas containing sulfur dioxide.

4. A process as claimed in claim 1 wherein said substance is ammonium hydroxide.

5. A process as claimed in claim 1 wherein said sulfur dioxide is present as a small percentage component in a gas stream into which said solution is sprayed.

References Cited in the file of this patent

UNITED STATES PATENTS

| Number | Name | Date |
|---|---|---|
| 2,458,404 | Nagle | Jan. 4, 1949 |
| 2,555,667 | Zeegers | June 5, 1951 |